US010902608B2

(12) United States Patent
Hagiopol (10) Patent No.: US 10,902,608 B2
(45) Date of Patent: Jan. 26, 2021

(54) SEGMENTATION FOR HOLOGRAPHIC IMAGES

(71) Applicant: Microsoft Technology Licensing, LLC, Redmond, WA (US)

(72) Inventor: Alexandru Hagiopol, Daly City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/298,838

(22) Filed: May 23, 2019

(65) Prior Publication Data

US 2020/0372659 A1 Nov. 26, 2020

(51) Int. Cl.
*G06T 7/194* (2017.01)
*G06T 17/20* (2006.01)
*G06T 7/11* (2017.01)
*G06T 7/162* (2017.01)

(52) U.S. Cl.
CPC .............. *G06T 7/194* (2017.01); *G06T 7/11* (2017.01); *G06T 7/162* (2017.01); *G06T 17/20* (2013.01); *G06T 2207/20084* (2013.01); *G06T 2207/20224* (2013.01); *G06T 2207/30196* (2013.01)

(58) Field of Classification Search
None
See application file for complete search history.

(56) References Cited

U.S. PATENT DOCUMENTS

| 2010/0098343 A1* | 4/2010 | Perronnin | G06K 9/6226 |
| | | | 382/224 |
| 2019/0197696 A1* | 6/2019 | Van Droogenbroeck | |
| | | | G06T 7/251 |
| 2020/0000180 A1* | 1/2020 | Sherrah | A61B 5/107 |

OTHER PUBLICATIONS

Park et al.; "Unsupervised foreground segmentation using background elimination and graph cut techniques;" Electronics Letters; Sep. 24, 2009; vol. 45 No. 20; two pages; The Institution of Engineering and Technology (Year: 2009).*
"Mixture Model", Retrieved From: https://en.wikipedia.org/wiki/Mixture_model, Retrieved on: May 24, 2018, 14 Pages.

(Continued)

*Primary Examiner* — Edward Martello
(74) *Attorney, Agent, or Firm* — Workman Nydegger (57) ABSTRACT

Provided herein are methods, systems, and computer program products for calculating a refined segmentation of an image which identifies a foreground of the image and a background of the image. Embodiments include creating a refined segmentation of an image by accessing an image that includes a foreground image and background information; creating a first segmentation of the image by applying an image subtraction algorithm; creating a second segmentation of the image by applying a semantic segmentation algorithm; creating an initialization segmentation by combining the first segmentation and the second segmentation; and creating a resulting refined segmentation by refining the initialization segmentation using at least one of statistical analysis or graphical methods. Statistical analysis includes applying a Gaussian mixture model and graphical methods include a graph cut global optimization.

20 Claims, 7 Drawing Sheets

(56) References Cited

OTHER PUBLICATIONS

"Foreground Detection", Retrieved From: https://en.wikipedia.org/w/index.php?title=Foreground_detection&oldid=890911775, Apr. 4, 2019, 11 Pages.

Charles, et al., "SuBSENSE: A Universal Change Detection Method With Local Adaptive Sensitivity", In Journal of IEEE Transactions on Image Processing, vol. 24, Issue No. 1, Dec. 4, 2014, pp. 359-373.

Hrkac, et al., "Iterative Automated Foreground Segmentation in Video Sequences Using Graph Cuts", In the Proceedings of German Conference on Pattern Recognition, Nov. 3, 2015, pp. 308-319.

Kuzu, et al., "Volumetric Modeling Using Shape From Silhouette", Retrieved From: https://www.cv.tu-berlin.de/fileadmin/fg140/Volumetric_Modeling_using.pdf, 2001, 8 pages.

"International Search Report and Written Opinion Issued in PCT Application No. PCT/US2020/024537", dated Jul. 10, 2020, 13 Pages.

Sun, et al., "Background Cut", In the Proceedings of European Conference on Computer Vision, May 7, 2006, pp. 628-641.

Zeng, et al., "Background Subtraction with Real-time Semantic Segmentation", In Repository of arXiv:1811.10020v2, Dec. 12, 2018, 16 Pages.

\* cited by examiner

SEGMENTATION FOR HOLOGRAPHIC IMAGES

BACKGROUND

The ability to categorize pixels in an image is an important aspect of image processing. Segmentation of an image is mapping each of its constituent pixels to a category such as "human," "structure," "target image," "background," or "foreground," etc. Segmentation is a crucial input to a hologram reconstruction pipeline which fuses 2D segmentations to produce a 3D mesh which depicts or represents a desired 3D object (e.g., person, building, etc.).

A number of techniques have been proposed to enable extraction of a foreground from an image. For example, it may be useful to extract an object or a person from a digital image which includes the object or person standing in front of a scenic backdrop view. This process of splitting an image into the foreground and background is known as image segmentation. Image segmentation comprises labeling image elements (such as pixels, groups of pixels, voxels or groups of voxels) as either a foreground (i.e., target) or a background image element. This is useful in digital photography, medical image analysis, hologram constructions, virtual reality applications, and other application domains where it is helpful to find a boundary between a desired or target object in the image and a background of the image. The extracted object and the background may then be processed separately, differently, etc. For example, it may be useful to separate a person in an image from the background scenery in the image. In another example, in the case of a medical image it may be appropriate to segment out a region of an image depicting a tumor or organ such as the lungs in order to enable a surgeon to interpret the image data.

Depending upon the technique used, the amount of user input that is involved to achieve the segmentation can vary significantly and in some systems a user traces the approximate outline of the object to be extracted. In other systems, the user draws a box on the image which contains the object of interest. This box is used to specify foreground and background training data which can then be used in segmenting the image. In other systems, a user identifies, pixel-by-pixel, whether each pixel in an image is a foreground pixel or background pixel.

Existing computer-implemented techniques for segmentation of images into foreground portions and background portions have not produced perfectly accurate results and, accordingly, any improvements to the accuracy of image segmentations or the speed or efficiency with which they can be produced would be useful and desirable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Provided herein are methods, systems, and computer program products for determining a segmentation of an image. The segmentation of the image can identify a foreground (i.e., target) portion of the image and a background portion of the image. The segmentation can be determined by refining a combination of two prior segmentations of the image, a first segmentation which can be produced by a subtraction segmentation in which a background image is subtracted from the image and a second segmentation which can be produced by applying a neural network to the image.

In one embodiment as described herein, an image is accessed which includes a foreground image and background information. A first segmentation of the image can be created by applying an image subtraction algorithm to the image. A second segmentation of the image can be created by applying a semantic segmentation algorithm (e.g., neural network) to the image. An initialization segmentation can then be created by combining the first segmentation and the second segmentation. A resulting refined segmentation can then be created by refining the initialization segmentation using at least one of statistical analysis or graphical methods. In general, the result segmentation can be a more accurate segmentation of the image into foreground and background portions than both the first segmentation and second segmentation of the image.

The result segmentation can be used to separate and/or extract a foreground image (e.g., target image) from an image comprising both a foreground image and background information (such as background scenery). In some embodiments, a separated foreground (target) image may then be used in conjunction with a plurality of other separated foreground images to create a three-dimensional (3D) mesh representation of the scene captured by the plurality of images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Provided herein are methods, systems, and computer program products for determining a segmentation of an image. The segmentation of the image can identify a foreground (i.e., target) portion of the image and a background portion of the image. The segmentation can be determined by refining a combination of two prior segmentations of the image, a first segmentation which can be produced by a subtraction segmentation in which a background image is subtracted from the image and a second segmentation which can be produced by applying a neural network to the image.

In one embodiment as described herein, an image is accessed which includes a foreground image and background information. A first segmentation of the image can be created by applying an image subtraction algorithm to the image. A second segmentation of the image can be created by applying a semantic segmentation algorithm (e.g., neural network) to the image. An initialization segmentation can then be created by combining the first segmentation and the second segmentation. A result segmentation can then be created by refining the initialization segmentation using at least one (or both) of statistical analysis or graphical methods. Statistical analysis may be applying a Gaussian mixture model to the initialization segmentation. Graphical methods may include applying a graph cut to the initialization segmentation. In some embodiments, a graph cut may be applied to the intermediate result of applying a Gaussian mixture model to the initialization segmentation in order to produce the result segmentation. In general, the result segmentation can be a more accurate segmentation of the image into foreground and background portions than both the first segmentation and second segmentation of the image.

The result segmentation can be used to separate a foreground image (e.g., target image) from an image comprising both a foreground image and background information (such as background scenery). The separated foreground (target) image may then be used in conjunction with a plurality of other separated foreground images to create a mesh representing a three-dimensional (3D) representation of the target image.

Figure 1:
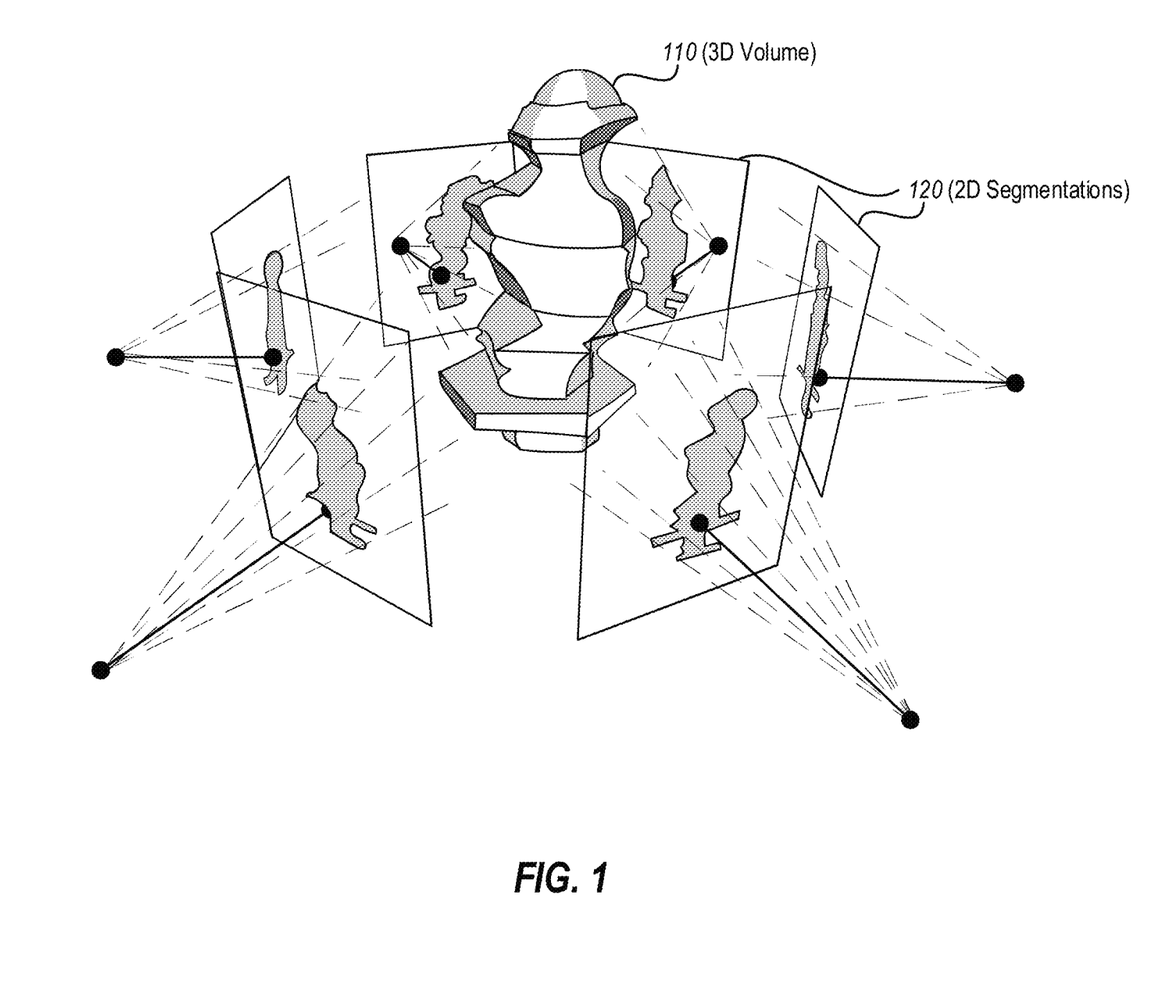
FIG. 1 illustrates a three-dimensional volume and plurality of 2D images which can be used to represent the volume in a hologram.

As depicted in FIG. 1, a 3D volume 110 is illustrated. Such a 3D volume may be a person standing amongst scenery, a person standing in a studio (see FIG. 2, item 220), an object such as a car, building, airplane, etc., which is in an image which also contains background details and information such as the surroundings of the car, building, airplane, etc.

In order to create a holographic image (hologram) of the 3D volume, a plurality of 2D images 120 may be combined into a mesh to create the illusion of the 3D volume 110. As depicted in FIG. 1, each of the 2D images 120 is a view of the 3D volume from a different perspective. The 2D images can be created by separating the foreground (target) image from the background information from an original image. For example, it may be useful and desirable to separate the person in the image 220 (in FIG. 2) from the background of image 220 (i.e., the elements of the studio) to leave only the person. This can be done by segmentation of the image 220 into foreground and background portions of the image. A great many of similar images of the person in image 220 may also be recorded from different viewing angles (as depicted in FIG. 1), each of those images also segmented per the teachings herein, and that plurality of images may then be composed in a mesh to represent a 3D image (hologram) of the person standing in the studio.

Holograms and Virtual Reality

Holograms depicted in video can be composed of, for instance, thirty three-dimensional (3D) volumes per second. Each volume can be composed of multiple 2D images, each of which is a view of the 3D volume from a different perspective. For instance, FIG. 1 depicts such a 3D volume 110 or object and some of its constituent 2D images 120 which can be combined in a mesh and used to represent the 3D volume in a hologram or in a virtual reality scenario. As can be appreciated, with 30 3D volumes per second of video and each 3D volume comprising a great many discrete 2D images of the 3D volume, each from a different perspective, viewing angle, or viewpoint, a hologram used in a virtual reality environment requires a composition of a very large number of 2D images. Each of the 2D images, in turn, is generally created by segmenting an initial image into foreground and background portions and then extracting the foreground (target) image from the initial images. As can be appreciated, it is useful and beneficial to have a robust and accurate method for segmentation of images into foreground and background when creating holographic images and holographic video (as in virtual reality environments).

It will be appreciated that the scope of this disclosure includes any combination of the embodiments described herein. It will be also appreciated, in view of the foregoing, that the current embodiments enable a computing system to produce a more refined, enhanced, and/or accurate result than known, previous, or existing techniques for segmentation of images.

Segmentation

Some discussion of segmentation can be useful in understanding the disclosure presented herein. An input image may be represented as an array z comprising N pixels. N may be very large. For instance, in a 12 megapixel image, N may be large enough such that the array z has an entry for each pixel (e.g., N≥12,000,000). Each pixel may be represented as black & white (B/W), grayscale, or in some color space (such as RGB or CMYK), etc. The array z or plurality of indexed N pixels may be indicated as $z=(z_1, z_2, z_3, \ldots, z_n, \ldots z_N)$, indexed by the index n. Of course, other data structures may also be used to represent the pixels of an image. For example, a 2D image may be represented by 2 dimensional array or an I×J matrix instead of a one dimensional array of order N. For example, a 12 megapixel image might be represented by a 4200×2800 pixel array or 4200× 2800 pixel matrix.

Indexed pixels z of an image may be input to a segmentation analysis to segment the foreground from the background. To segment the pixels of the input image, each pixel may be defined or analyzed and determined as being either foreground or background. For example, a plurality of pixels in an input image may be labeled as one of foreground or background. In some cases this may be done computationally and in other cases, as in common objects training images (discussed below), this may be a painstaking manual process whereby a person identifies, pixel by pixel, whether pixels in an image are foreground or background.

Segmentation of the image may be expressed as a corresponding array a or plurality of opacity or segmentation state values $\alpha=(\alpha_1, \alpha_2, \alpha_3, \ldots \alpha_n, \ldots \alpha_N)$, where the value of $\alpha_n \in \alpha$ may indicate the segmentation layer (e.g., foreground or background) of the associated pixel (i.e., $z_n \in z$) with a segmentation indicator. The segmentation indicators or values may be stored in any suitable format and manner, such as in a data store.

A segmentation may be a hard segmentation (i.e., a pixel may be classified as one of either foreground or background). Foreground and background segment indicators or labels may have any suitable value, such as binary values, text labels, integer values, real values, and the like. In one example, the segment indicator $\alpha_n$ for a pixel $z_n$ may be one of the set of either 0 or 1. In one example, a value of 0 could indicate background, and a value of 1 could indicate foreground. In some cases, null and/or negative values may be used to indicate a particular segmentation state or layer. In another example, the foreground segmentation indicator may be string of "F" while the background segmentation indicator may be a string of "B". It may also be appreciated that other labels, values, number of labels and the like may be used. Integer or fractional opacities or segmentation indicator values are also possible. Such integer or fractional segmentation indicator values may indicate an unknown or likely state of the associated pixel. For example, a segmentation value $\alpha_n$ for a pixel $z_n$ may be represented by an 8-bit integer having a value between 0 and 255. In this example, an may have a value of 0, indicating a background pixel, a value of 255, indicating a foreground pixel, a value of 128, indicating it's unknown or equally likely a pixel is foreground or background, or another value, $0 \leq \alpha_n \leq 255$, indicating a relative likelihood (in a uniform distribution) that a pixel is foreground or background.

Refined and more accurate segmentation, identification of pixels as foreground, background, unknown, or a possible likelihood of foreground or background, can be accomplished by the methods, systems, and other embodiments as described herein.

Initial Image

An image can be accessed which includes a foreground image and background information (e.g., background image). This image may have been taken with a digital camera and stored in computer memory or durable data storage. The image may be any form as is known in the art. The image may be stored as an array of pixels or a matrix (as described above). The image may be accessed using common techniques such as database access or an operating system file system call.

Subtraction Segmentation

Figure 2:
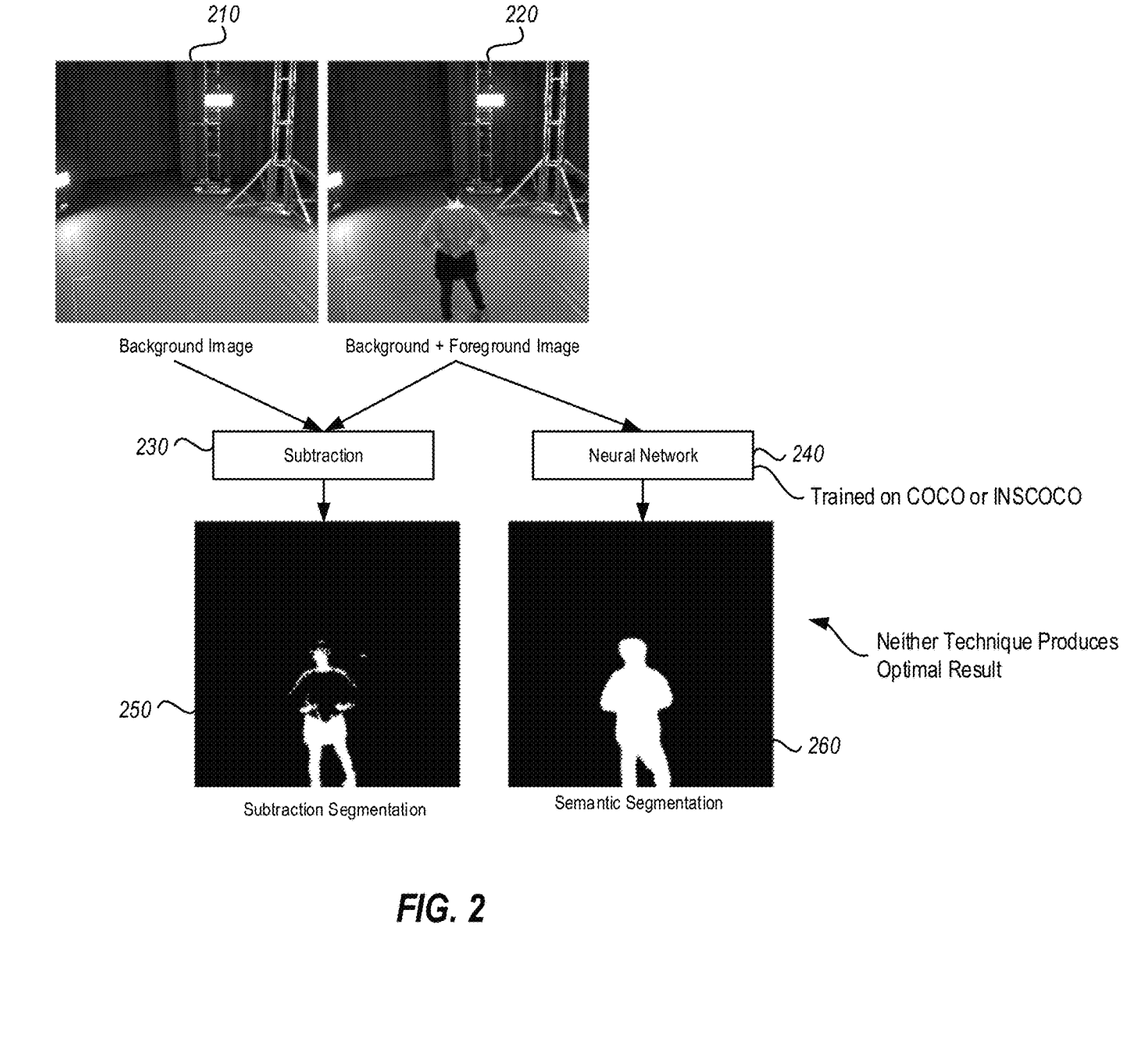
FIG. 2 illustrates two methods for creating a segmentation of an image into foreground and background portions.

A first segmentation of the image may be created by applying an image subtraction algorithm 230 to the image. In an image subtraction algorithm, a background image corresponding to the accessed image can be subtracted pixel-by-pixel from the image. A background image is generally an image of the scene of the image without the target image (i.e., foreground image) present in the image. As illustrated in FIG. 2, a background image (e.g., FIG. 2, item 210) can be subtracted pixel-by-pixel from the image (e.g. FIG. 2, item 220).

For example, the image 220 may represented by an array ZI of pixels (as described above). The background image may also be represented by an array ZB of corresponding pixels. The values $ZI_n$ and $ZB_n$ of the pixels in may be, for example, represented by 8-bit grayscale. The values of $ZB_n$ may be subtracted from the corresponding $ZI_n$ to form a new difference array ZD of the grayscale difference between ZI and ZB. A threshold difference may then be applied to each element of the difference array ZD where a difference below a the threshold is identified as a background pixel and a difference above the threshold is identified as a foreground pixel. The result of this is a subtraction segmentation of the image into foreground and background. An example of this subtraction segmentation is shown in FIG. 2 where a background image 210 is subtracted 230 from an image 220 to produce the subtraction segmentation 250. As can be appreciated, subtraction segmentation may be performed on B/W images, grayscale images, and images using other color space schemes, etc.

There can be, however, considerable limitations with subtraction segmentations. When there is little difference or little contrast between the target image and background image, a subtraction segmentation may be measurably inaccurate. For example, as in FIG. 2, where there is little difference between the woman's sweater in the image 220 and the background scene in the background image 210, the subtraction segmentation 250 may incorrectly identify a significant part (e.g., most of the sweater) of the target image (e.g., the woman) as background.

Figure 4:
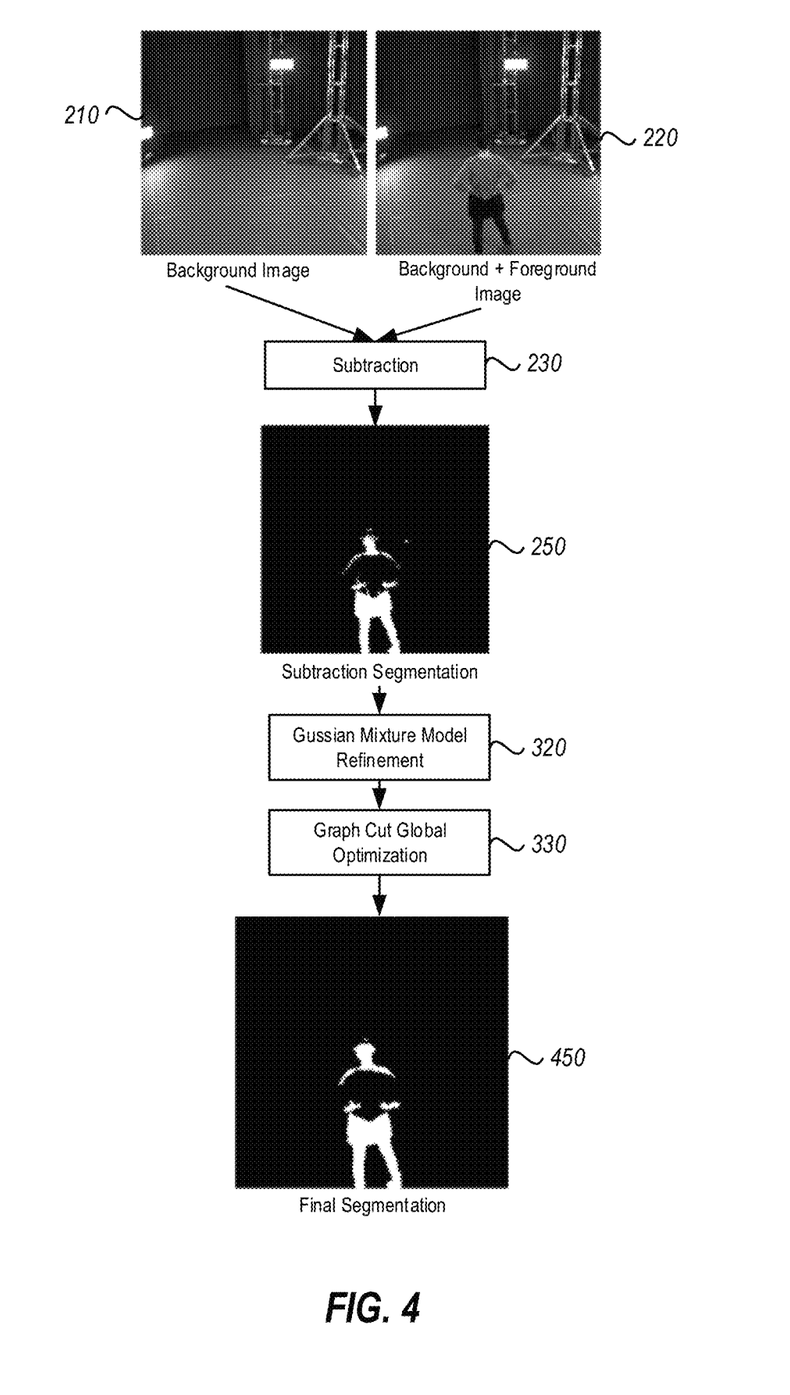
FIG. 4 illustrates a suboptimal result of refining a single segmentation produced by a single segmentation method.

As depicted in FIG. 4, a subtraction segmentation may be refined somewhat by applying statistical or graph theoretic techniques. However, challenging datasets (i.e., images) with, for instance, poor lighting or high color similarity between a target image and background (as in image 220) can cause inaccurate subtraction segmentation results 250 and, subsequently, even when refinement techniques (e.g., Gaussian mixture model 320 and/or graph cut optimization 330) are applied, will yield very inaccurate and sub-optimal final segmentation 450 results. These final results can be improved by the techniques and method described herein.

Semantic Segmentation

Another method for segmentation of an image is semantic segmentation. In this technique, an image may be presented as input to a trained neural network. In this case, the neural network may have been trained by a large number of training images which have pixels of target images (e.g., people, cars, busses, planes, building, etc.) already identified as foreground and pixels outside the target images identified as background. Libraries of such training images have been prepared for use in training such neural networks, such as Common Objects in Context (COCO) and MS COCO (Microsoft Common Objects in Context). These training sets comprise tens of thousands of images of various already identified objects which can be used to train the neural network.

As can be appreciated, preparation of such training sets is a time-consuming and painstaking process. For instance, it may require an analyst to view an image and label each of its pixels as either foreground or background. In a 12 megapixel image, for instance, that would require the analyst to classify each of 12 million pixels as either foreground or background. (That's clicking on a lot of pixels!) This process would necessarily need to be repeated for many different images of similar things (e.g., a person) to provide a training set for identifying "persons" as foreground and the remainder of the image as background. Of course, this process would need to be repeated for each object of interest (e.g., car, bus, bridge, building, etc.) for which there might be a use for identifying that object as foreground (with the remainder background). Furthermore, applications like holograms and virtual reality demand pixelwise segmentation accuracy especially in the case of human hologram reconstruction: the artifice of virtual reality falls apart when the viewer's own detailed knowledge of the human form is not faithfully reproduced by the hologram. As can be appreciated, although there are neural networks configured for segmenting images into foreground and background, the limitations on the amount and accuracy of training data means results in the resulting semantic segmentations being less than optimally accurate.

For example, in FIG. 2, the image 220 is processed by a trained neural network 240 to segment the image 220 into a resulting segmentation 260. The resulting semantic segmentation 260, although useful, is not a completely accurate representation of a separation of the foreground (e.g., woman) from the background scene (e.g., studio surroundings) in the image 220.

As can be appreciated, due to the low annotation precision of COCO and/or MS COCO (or other image segmentation training sets), and due to GPU memory limits on image and neuron layer matrix dimensions, semantic segmentation results by application of the trained neural network may not be as good as a subtraction segmentation result when there are perfect or optimal studio conditions for the initial image and background image. (However, as may be further appreciated, optimal studio conditions are not always available.)

Refinement of Segmentation

A method for refining image segmentations to produce a more useful and more accurate segmentation is useful and is described herein. Two segmentations of an image may be combined and then refined to produce an improved or more accurate resulting segmentation. A first segmentation of an image produced by subtraction segmentation and a second segmentation of the image produced by semantic segmentation may be combined and then refined by statistical and/or graphical methods to produce a result segmentation. The resulting segmentation may be a more accurate separation of a foreground image (target image) from background in an initial image.

Combine Segmentations

An image can be accessed. For example, the image can be accessed from data storage. A first segmentation can be created by applying an image subtraction algorithm (as described above). A second segmentation can be created by applying an image subtraction algorithm (as described above). (Note: the actual creation of either or both of the first and second segmentations may have been done beforehand. In this case, the segmentations which were created beforehand may then be accessed from data storage.)

Figure 3:
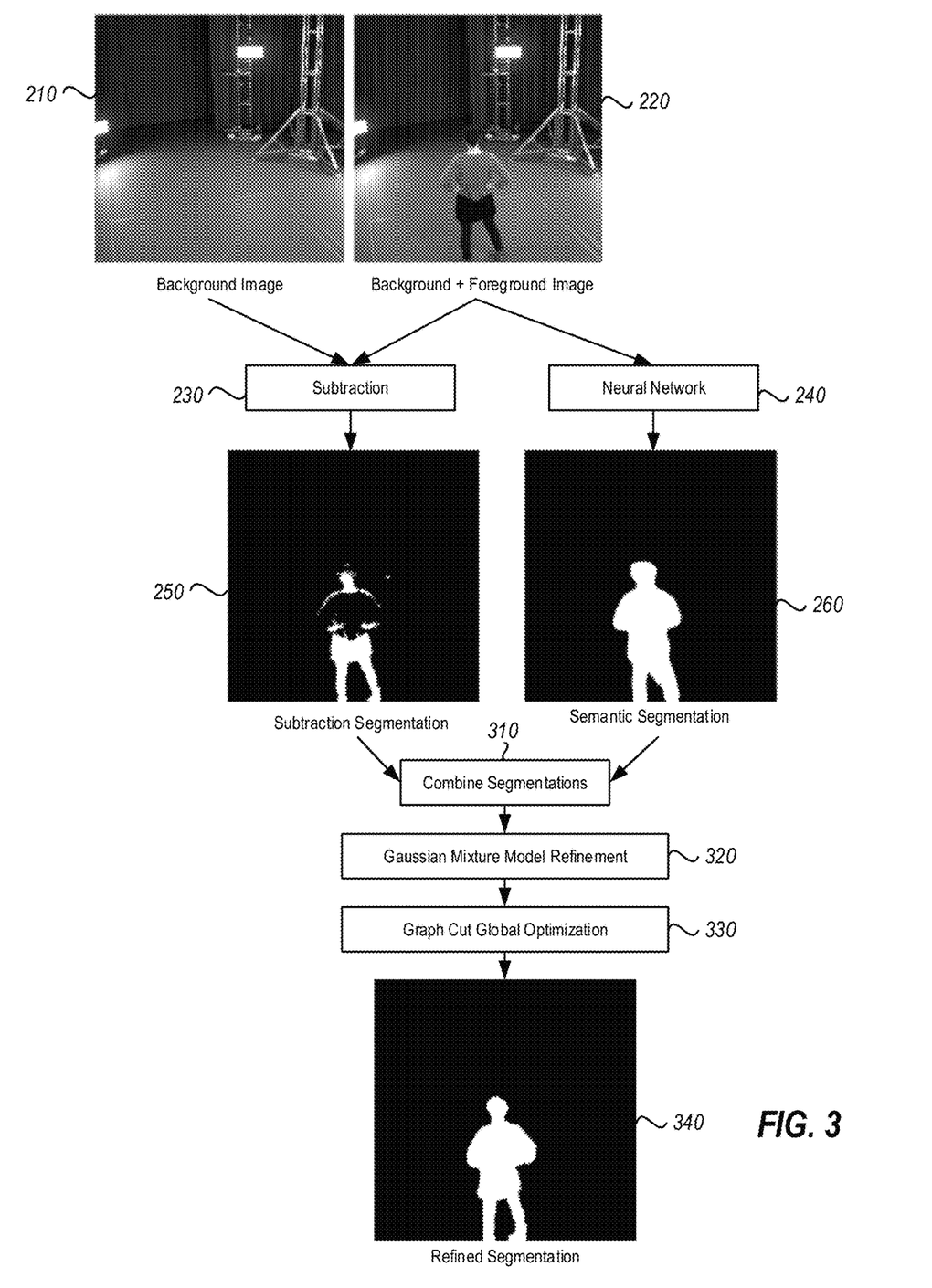
FIG. 3 illustrates combining two image segmentations of an image produced by different methods and refining the combined segmentation into a more accurate refined segmentation of the image.

The first segmentation, created by applying an image subtraction algorithm, and the second segmentation, created by applying an image subtraction algorithm, can then be combined. As illustrated in FIG. 3, the subtraction segmentation 250 and the semantic segmentation 260 can be combined into an initialization segmentation. The initialization segmentation can then be used for further processing.

In one embodiment, the subtraction segmentation is represented as a matrix of 8-bit integers. Any pixel whose subtraction difference is above a determined threshold is set to 255. All other pixels are set to zero (0). In this case, for instance, a pixel assigned 255 is identified as a foreground pixel and a pixel assigned zero is identified as a background pixel.

A semantic segmentation can be treated similarly. The semantic segmentation may be a matrix of 8-bit integers having values between 0 and 255. Any pixel calculated by the neural network (as described above) to be most likely to belong to a foreground image is assigned 255. All other pixels are assigned zero (0). The 0 and 255 may be thought of as an a priori likelihood of a pixel belonging to background or to foreground, respectively.

In one embodiment, the first (subtraction) segmentation and second (semantic) segmentation may be combined as follows:

Compare Corresponding Pixels

Inspect and compare each corresponding pair of pixels in the first and second segmentations (corresponding pixels having the same array indices or matrix coordinates and represent the same pixel in the original accessed image).

When Pixels in First and Second Segmentations Agree

For pixels in the second (semantic) segmentation which have a value 0 (i.e., background) and a corresponding pixel in the first (subtraction) segmentation which has a value 0 (i.e., background), assign a corresponding result pixel to be 0 (i.e., background). (In this case, both first and second segmentations agree.)

For pixels in the second (semantic) segmentation which have a value 255 (i.e., foreground) and a corresponding pixel in the first (subtraction) segmentation which has a value 255 (i.e., foreground), assign a corresponding result pixel to be 255 (i.e., foreground). (In this case, too, both first and second segmentations agree.)

When Pixels in First and Second Segmentations do not Agree

For pixels in the second (semantic) segmentation which have a value 255 (i.e., foreground) and a corresponding pixel in the first (subtraction) segmentation which has a value zero, assign a corresponding result pixel to be 255 (i.e., foreground). (This can be thought of as "trusting the neural network.")

For pixels in the second (semantic) segmentation which have a value zero (i.e., background) and a corresponding pixel in the first (subtraction) segmentation which has a value 255 (i.e., foreground), assign a corresponding result pixel to be 128 (i.e., "unknown"). (This can be thought of as "trusting neither.")

This is done for every corresponding pair of pixels in the first and second segmentations and results in another, third, segmentation. This third segmentation can be used as an initialization segmentation which can then be refined (i.e., made more accurate) by applying statistical and/or graph theoretic techniques to the initialization segmentation.

In some embodiments, the initialization segmentation may be refined by statistical methods as follows:

Compare Corresponding Pixels

Inspect and compare each pixel's segmentation value in the initialization segmentation to the segmentation value determined through statistical model inference for that pixel.

When the Pixel's Initialization Segmentation Value Agrees with the Model Inference Segmentation Do not change the pixel's segmentation value before passing it to the graph cut optimization.

When the Pixel's Initialization Segmentation Value Disagrees with the Model Inference Segmentation For pixels in the initialization segmentation which have a value 255 (i.e., foreground) but for which statistical model inference yields 0 (i.e. background), compare the pixel's subtraction value to the model mean for background.

If the difference between the pixel's subtraction value and the model mean is within a confidence threshold, then change the pixel's assignment from 255 to 0 before passing it to the graph cut optimization.

If the difference between the pixel's subtraction value and the model mean is not within a confidence threshold, change the pixel's value to 128 (i.e. unknown) before passing it to the graph cut optimization.

Statistical and Graph-Theoretical Techniques can be Used to Refine a Segmentation At this point, it is possible to enhance or make existing segmentations more accurate by applying statistical and/or graph theoretic techniques to the existing segmentations.

Using a segmentation produced by different methods and combined as an initialization to a statistical method and/or a graph theoretic method, an improved, refined, enhanced, and/or more accurate resulting segmentation may be produced. For instance, a segmentation produced by combining a background subtraction segmentation with a semantic segmentation may be used as an initial input which can then be analyzed statistically and modified to produce an improved segmentation. Such refinement methods may include statistical methods such as a Gaussian mixture model, a graph cut, an energy minimization scheme, etc. or combination of statistical methods and other refinement methods. Other statistical methods which may be known in the art may also be applied to enhance an existing segmentation.

The segmentation combining process described above can produce an array or matrix where each member has a value of 0, 128, or 255, corresponding to background, unknown, or foreground, respectively. This segmentation can be used as an initial algorithm state for a Gaussian mixture model refinement: the segmentation values can be used to compute the initial foreground and background Gaussian model parameters which may then be iteratively refined with an Expectation Maximization (EM) statistical procedure to infer a new segmentation based on the model parameters. The result of the Gaussian mixture model refinement may then be input to a graph cut refinement. The resulting refined segmentation produced by the Gaussian mixture model refinement and graph cut refinement has been shown to be a significant improvement over both of the first subtraction segmentation and the second semantic (neural net) segmentation.

For example, as depicted in FIG. 3, a first (subtraction) segmentation 250 may be combined 310 with a second (semantic) segmentation 260. Combining the first and second segmentations produces an initialization segmentation which can then be used as input for further refinement. The initialization segmentation that results from combining 310 is the initial input to a Gaussian mixture model refinement 320. A graph cut global optimization 330 may then be performed on the result of the Gaussian mixture model refinement 320. As may be appreciated, the graph cut optimization may be a minimum s-t cut as part of an iterative energy minimization scheme (as is known in the art). This produces a resulting refined segmentation 340 which is a more accurate segmentation of the foreground and background portions of the initial image 220 than is produced by either of the subtraction segmentation or semantic segmentation of the initial image 220.

Figure 6:
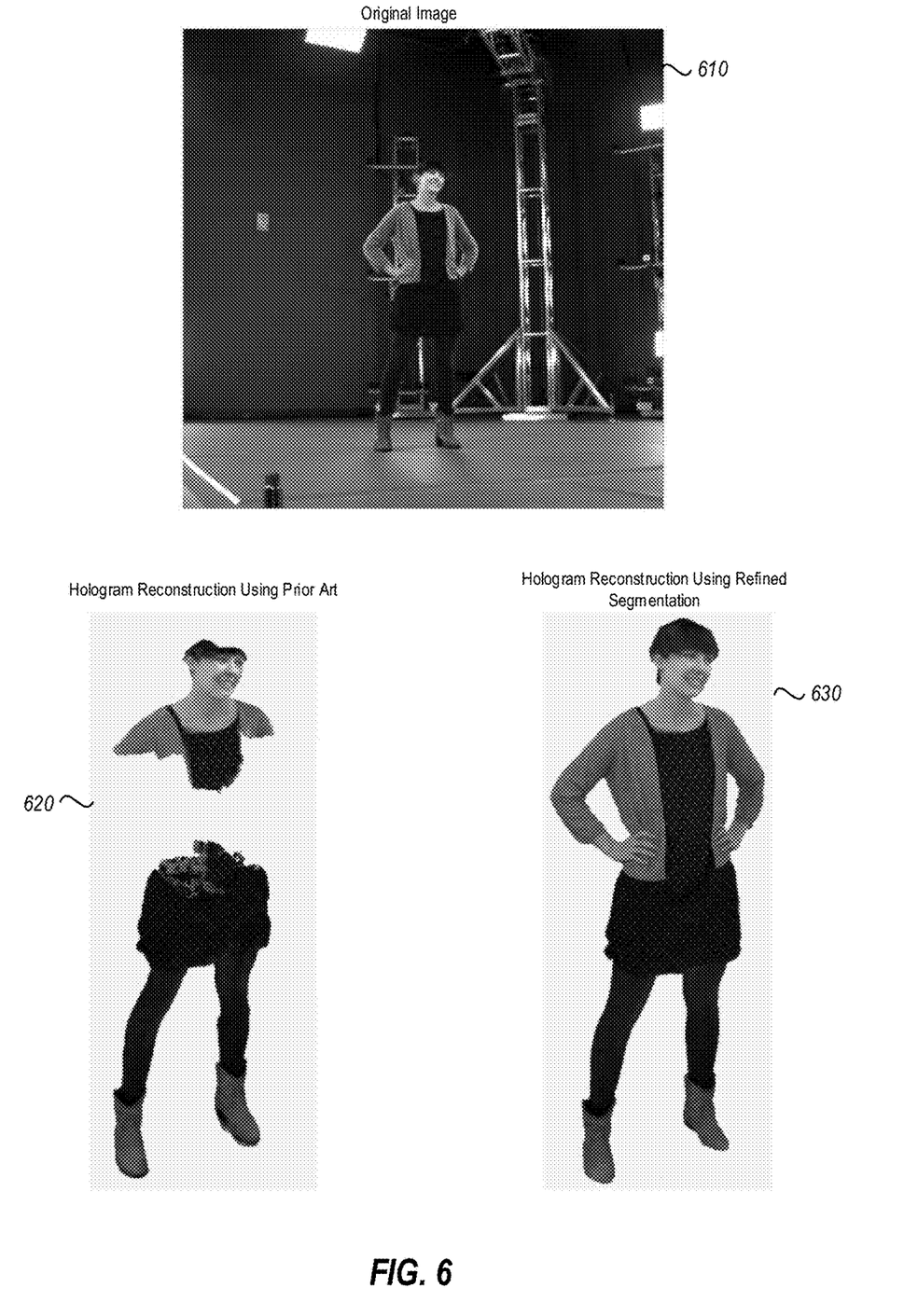
FIG. 6 illustrates a comparison of hologram reconstruction results using prior methods of segmentation and using methods described herein.

Results of the improved segmentation methods described herein are easily illustrated. FIG. 6 depicts the differences in hologram reconstructions which were created using prior segmentations performed using prior known methods and the embodiments described herein. An original image 610 includes both a foreground image (e.g., person) and background information (e.g., the background of the studio). A hologram reconstruction using prior image segmentation methods produced the image illustrated in image 620. A refined segmentation produced according to the methods described herein was then used to produce the more accurate image reconstruction which resulted in the image 630.

Figure 5:
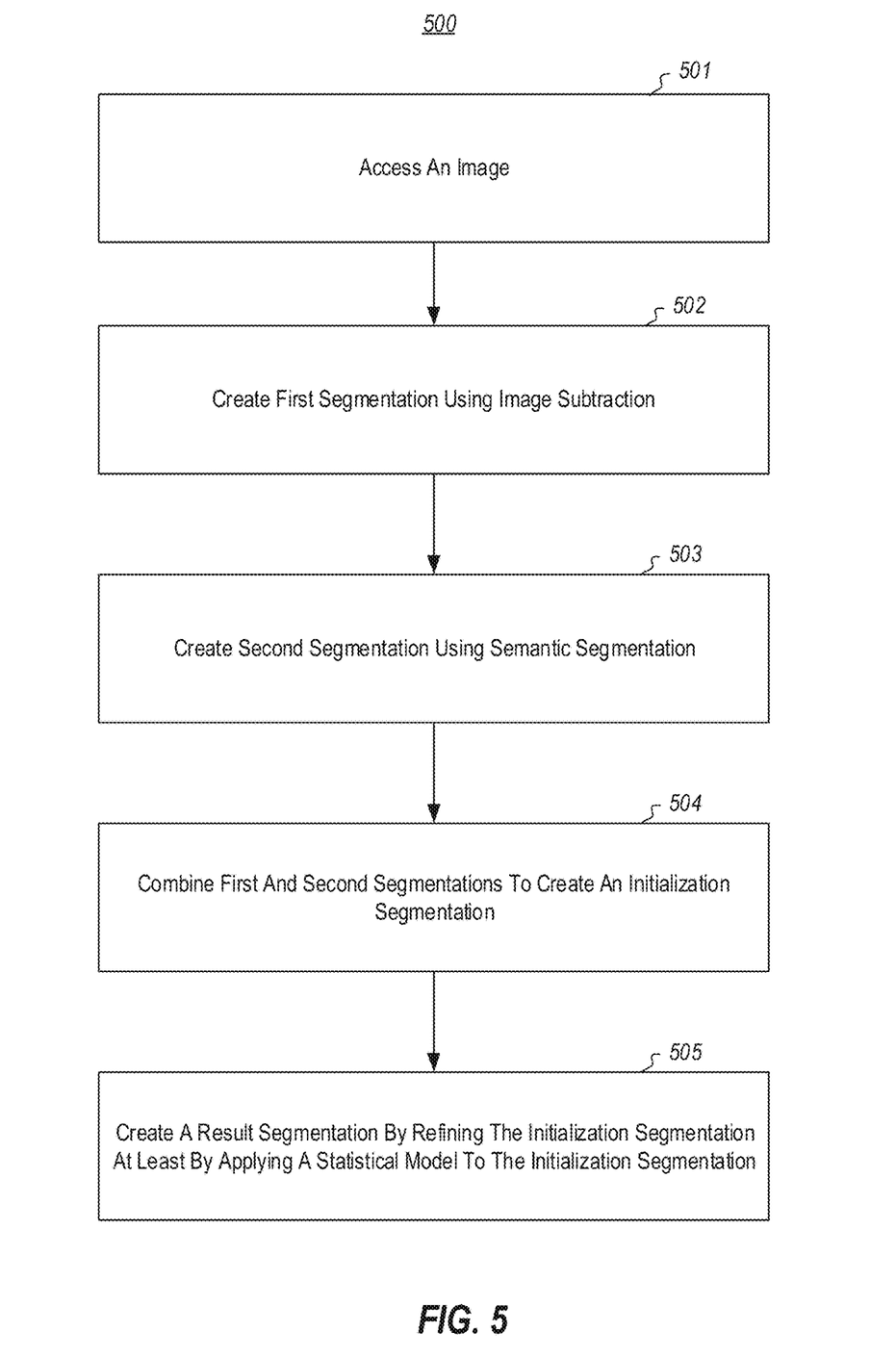
FIG. 5 illustrates a flowchart of a method for calculating a refined segmentation of an image which identifies a foreground of the image and a background of the image.

One embodiment of a process for refining segmentation of an image into foreground and background portions is illustrated in FIG. 5. FIG. 5 depicts a method for refining segmentation of an image into foreground and background portions. Initially, an image is accessed 501. The image may contain both a foreground portion (e.g., target image) and a background portion. A first segmentation may be created 502 using image subtraction. The first segmentation may be created as described above by subtracting a background image from the accessed image. The background image may be accessed from durable memory just as the image, itself. Of course, the subtraction segmentation may have been produced beforehand and it, too, can be accessed from memory or a data store much like the original image.

A second segmentation is also created 503 by using semantic segmentation. Creating the second segmentation by using semantic segmentation can be performed by applying a trained neural network to the accessed image as described above. Of course, the semantic segmentation may have been produced beforehand and it, too, can be accessed from memory or a data store much like the original image.

The first and second segmentations may then be combined 504 as described above. This may be done by a pixel-by-pixel comparison of the first and second segmentations as described above and produce a third segmentation which can then be used as an initialization segmentation for further refinement.

A resulting refined segmentation may then be created 505 by applying refinement techniques to the initialization segmentation. The refinement techniques may include statistical techniques such as a Gaussian mixture model and graph theoretic techniques such as a graph cut global optimization.

The process as illustrated in FIG. 5 and described above, may be implemented on a computer system and may be implemented in computer-executable code with can then be run on a suitable computing system.

Exemplary Computer System

The disclosed methods may be practiced by and within various types of special purpose or general-purpose computing systems including computer hardware.

Figure 7:
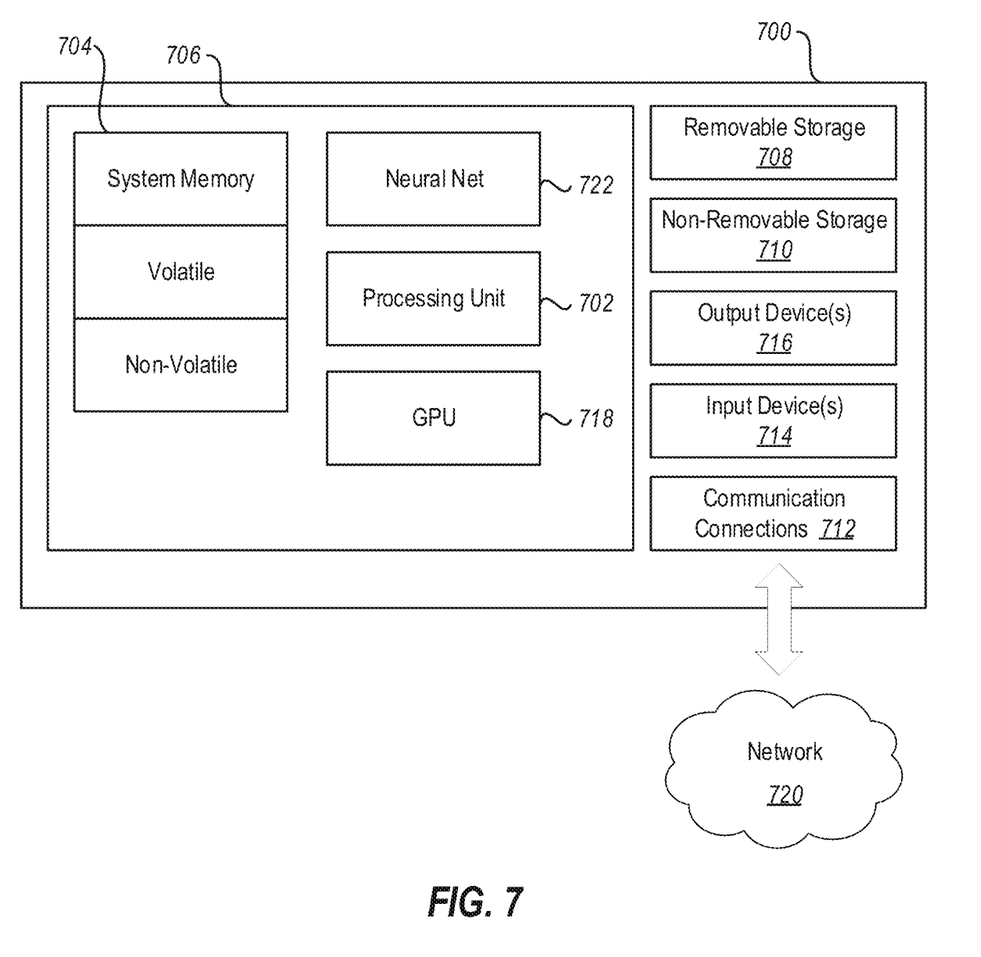
FIG. 7 illustrates an exemplary computing environment in which embodiments described herein may be performed.

FIG. 7, depicts an exemplary system for implementing the image segmentation refinement techniques described herein. The system of FIG. 7 includes a computing device, such as computing device 700. In its most basic configuration, computing device 700 typically includes (but is not limited to) at least one processing unit 702 and memory 704. The system include memory 104 which may be volatile (such as RAM), non-volatile (such as ROM, flash memory, etc.) or some combination of the two. Additionally, computing system 700 may also have additional features and/or functionality. For example, system 700 may also include additional storage (e.g., removable and/or non-removable) including, but not limited to, magnetic or optical disks or tape. Such additional storage may include removable storage 708 and non-removable storage 710. Computer storage media includes volatile and nonvolatile, removable and non-removable storage media implemented in any method or technology for storage of information such as computer readable instructions, data structures, program modules, or other data. Memory 704, removable storage 708, and non-removable storage 710 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Neural networks may be implemented in hardware, software, or a combination of both. The system 700 may include such a neural network 722 which may be implemented in hardware, software, or a combination of both. The neural network 722 may be used in the processing of images and, in particular, the calculation of semantic segmentations of images. The system 700 may also include a graphics processing unit (GPU) 718. The GPU 718, as is known in the art, can serve multiple purposes in image processing and analysis as well as generic functions requiring or being enabled by the capability of modern GPUs.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and computer-readable transmission media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer. As is well-known, computer-readable storage devices are physical articles of manufacture which can store data which is readable or otherwise accessible to computer systems.

System 700 may also contain one or more communication connections 712 that allow the device 700 to communicate with other devices, such as with other computing devices through network 720. Communications connections 712 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both physical storage media and communication media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically or otherwise from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those having skill in the art will appreciate that storage devices utilized to store program instructions can be distributed across a network. For example a remote computer may store an example of the process described as software. A local or terminal computer may access the remote computer and download a part or all of the software to run the program. Alternatively, the local computer may download pieces of the software as needed, or process in a distributed computing environment by executing some software instructions at the local terminal and some (or all) at a remote computer or remote computers in a distributed computing environment. Those skilled in the art will also appreciate that by utilizing conventional techniques known to those skilled in the art that all, or a portion of the software instructions may be carried out by a dedicated circuit, such as a DSP, application specific integrated circuit (ASIC), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Those skilled in the art will appreciate that the invention may be practiced in computing environments including network computing environments with many types of computer system configurations, including, distributed computing systems, cloud computing systems, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (by network data communication links, by hardwired data links, wireless data links, or by any combination of network, hardwired, or wireless data links) through a network, both perform tasks. In a distributed system environment, program modules may be located in both local and remote memory storage devices.

System 700 may also have one or more input devices 714 such as keyboard, mouse, pen, voice input device, touch input device, laser range finder, infra-red cameras, video input devices, and/or any other input device. Output devices 716 such as one or more displays, speakers, printers, and/or any other output device may also be included.

SUMMARY

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method for calculating a refined segmentation of an image which identifies a foreground of the image and a background of the image, the method comprising:
    accessing an image, the image including a foreground image and background information;
    creating a first segmentation of the image by applying an image subtraction algorithm;
    creating a second segmentation of the image by applying a semantic segmentation algorithm;
    creating an initialization segmentation by combining the first segmentation and the second segmentation; and
    creating a resulting refined segmentation by refining the initialization segmentation using at least statistical analysis and graphical methods, the resulting refined segmentation being a more accurate segmentation of the image into foreground and background portions than the first segmentation and second segmentation of the image.

2. The method of claim 1, wherein the first segmentation of the image as an array or a matrix of integers, each integer representing a pixel in the image and the value of each integer represents a likelihood of the pixel being part of the foreground of the image.

3. The method of claim 1, wherein the second segmentation of the image as an array or a matrix of integers, each integer representing a pixel in the image and the value of each integer representing a likelihood of the pixel being part of the foreground of the image.

4. The method of claim 1, wherein combining includes comparing corresponding integer representations of pixels from each of the first and second segmentations and resolving conflicts.

5. The method of claim 1, wherein combining includes comparing integer representations of corresponding pixels from each of the first and second segmentations, resolving conflicts, and the initialization segmentation comprises values selected from 0, 128, and 255, with 0 representing a background pixel, 255 representing a foreground pixel, and 128 representing an unknown pixel.

6. The method of claim 1, wherein the resulting refined segmentation is used to extract a target image and the extracted target image is one of a plurality of images which are composed to create a mesh representing a 3D volume in a hologram.

7. The method of claim 1, wherein the statistical analysis comprises applying a Gaussian mixture model.

8. The method of claim 1, wherein the graphical methods comprise a graph cut global optimization.

9. The method of claim 1, wherein refining the initialization segmentation comprises applying a Gaussian mixture model to the initialization segmentation and comprises performing a graph cut global optimization to the result of applying a Gaussian mixture model to the initialization segmentation.

10. The method of claim 1, further comprising applying the resulting refined segmentation to the accessed image to extract the foreground image.

11. A system for calculating a refined segmentation of an image which identifies a foreground of the image and a background of the image, the system comprising:
    one or more computer processors; and
    one or more data storage devices having stored thereon computer-executable instructions which, when executed upon the one or more computer processors, enable the system to perform:
        accessing an image, the image including a foreground image and background information;
        creating a first segmentation of the image by applying an image subtraction algorithm;
        creating a second segmentation of the image by applying a semantic segmentation algorithm;
        creating an initialization segmentation by combining the first segmentation and the second segmentation; and
        creating a resulting refined segmentation by refining the initialization segmentation using at least statistical analysis and graphical methods, the resulting refined segmentation being a more accurate segmentation of the image into foreground and background portions than the first segmentation and second segmentation of the image.

12. The system of claim 11, wherein the system comprises additional computer-executable instructions such that the system is further enabled to extract the foreground image from the image by using the refined segmentation.

13. The system of claim 11, wherein combining includes comparing integer representations of corresponding pixels from each of the first and second segmentations, resolving conflicts, and the initialization segmentation comprises values selected from 0, 128, and 255, with 0 representing a background pixel, 255 representing a foreground pixel, and 128 representing an unknown pixel.

14. The system of claim 11, wherein the resulting refined segmentation is used to extract a target image and the extracted target image is one of a plurality of images which are composed to create a mesh representing a 3D volume in a hologram.

15. The system of claim 11, wherein refining the initialization segmentation comprises applying a Gaussian mixture model to the initialization segmentation and comprises performing a graph cut global optimization to the result of applying a Gaussian mixture model to the initialization segmentation.

16. A computer program product for calculating a refined segmentation of an image which identifies a foreground of the image and a background of the image, the computer program product comprising one or more hardware data storage devices having stored thereon computer-executable instructions which, when executed upon one or more computer processors of a computer system, enable the system to calculating a refined segmentation of an image which identifies a foreground of the image and a background of the image by:
    accessing an image, the image including a foreground image and background information;
    creating a first segmentation of the image by applying an image subtraction algorithm;

creating a second segmentation of the image by applying a semantic segmentation algorithm;
creating an initialization segmentation by combining the first segmentation and the second segmentation; and
creating a resulting refined segmentation by refining the initialization segmentation using at least statistical analysis and graphical methods, the resulting refined segmentation being a more accurate segmentation of the image into foreground and background portions than the first segmentation and second segmentation of the image.

17. The computer program product of claim 16, comprising additional computer-executable instructions which, when executed, enable the system to extract the foreground image from the image by using the refined segmentation.

18. The computer program product of claim 16, wherein combining includes comparing integer representations of corresponding pixels from each of the first and second segmentations, resolving conflicts, and the initialization segmentation comprises values selected from 0, 128, and 255, with 0 representing a background pixel, 255 representing a foreground pixel, and 128 representing an unknown pixel.

19. The computer program product of claim 16, wherein the resulting refined segmentation is used to extract a target image and the extracted target image is one of a plurality of images which are composed to create a mesh representing a 3D volume in a hologram.

20. The computer program product of claim 16, wherein refining the initialization segmentation comprises applying a Gaussian mixture model to the initialization segmentation and comprises performing a graph cut global optimization to the result of applying a Gaussian mixture model to the initialization segmentation.

\* \* \* \* \*